United States Patent
Huck et al.

(10) Patent No.: US 7,688,717 B2
(45) Date of Patent: Mar. 30, 2010

(54) TRANSPORT NETWORK RESTORATION METHOD SUPPORTING EXTRA TRAFFIC

(75) Inventors: Martin Huck, Marbach (DE); Stefan Ansorge, Ohmden (DE)

(73) Assignee: Alcatel, Paris (FR)

( * ) Notice: Subject to any disclaimer, the term of this patent is extended or adjusted under 35 U.S.C. 154(b) by 1093 days.

(21) Appl. No.: 11/150,127

(22) Filed: Jun. 13, 2005

(65) Prior Publication Data

US 2006/0002293 A1 Jan. 5, 2006

(30) Foreign Application Priority Data

Jul. 2, 2004 (EP) .................. 04291693

(51) Int. Cl.
*H04L 1/00* (2006.01)
(52) U.S. Cl. .................. 370/222; 370/218; 370/228
(58) Field of Classification Search .......... 370/228, 370/222–223, 217–220, 225, 224; 398/1–4
See application file for complete search history.

(56) References Cited

U.S. PATENT DOCUMENTS

| 6,061,329 | A * | 5/2000 | Abe .................... 370/228 |
| 2003/0067867 | A1* | 4/2003 | Weis ................... 370/210 |
| 2003/0137932 | A1* | 7/2003 | Nishioka et al. ......... 370/216 |
| 2004/0076151 | A1* | 4/2004 | Fant et al. ............. 370/389 |

FOREIGN PATENT DOCUMENTS

| EP | 1 134 922 A | 9/2001 |
| EP | 1 294 136 A | 3/2003 |
| EP | 1 463 370 A1 | 9/2004 |

OTHER PUBLICATIONS

Bala, Rajagopalan et al: "Signaling for Fast Restoration in Optical Mesh Networks, draft-bala-restoration-signaling-01. txt." Internet Draft, 'Online! Feb. 20, 2002, XP002307385.

* cited by examiner

*Primary Examiner*—Ian N Moore
*Assistant Examiner*—Peter Cheng
(74) *Attorney, Agent, or Firm*—Carmen Patti Law Group, LLC

(57) ABSTRACT

To restore a failed working path (WP) in a transport network, a restoration request is relayed between adjacent network elements (NE1, NE2) and the path set up hop by hop over spare resources by establishing local crossconnections (CC1, CC2) conforming to the request according to routing information locally stored within the network elements. During failure free operation, a low priority path (LPP A) for extra traffic with different signal structure is allowed on the spare resources and pre-empted in the case of a failure. The restoration request is forwarded using the old signal structure of the extra traffic path. Only after reception of a confirmation sent back by the peering node (NE2) using the new signal structure, the I/O port (211) is also reconfigured to the new signal structure.

10 Claims, 4 Drawing Sheets

TRANSPORT NETWORK RESTORATION METHOD SUPPORTING EXTRA TRAFFIC

The invention is based on a priority application EP 04 291693.2 which is hereby incorporated by reference.

FIELD OF THE INVENTION

The present invention relates to the field of telecommunications and more particularly to a path restoration method in a transport network and a network element with fast restoration capabilities.

BACKGROUND OF THE INVENTION

Transport networks serve for the physical layer transport of high bitrate tributary signals. In particular, the signals transmitted over a transport network are encoded and multiplexed into a continuous bit stream structured into frames of the same length. Within this constant bitrate bit stream, the frames are repeated periodically with a frame repetition rate of typically 8 kHz and are structured according to a multiplexing hierarchy. An example of such a multiplexing hierarchy is SDH (Synchronous Digital Hierarchy, see ITU-T G.707 10/2000) where the frames are termed synchronous transport modules of size N (STM-N, where N=1, 4, 16, 64,or 256). The frames have a section overhead and contain at least one higher order multiplexing unit called virtual container VC-4. A VC-4 can either directly carry a tributary signal or a number of lower order multiplexing units like VC-12 or VC-3, which then carry tributary signals. Alternatively multiple virtual containers can be concatenated to transport a higher bitrate tributary signal.

Virtual containers are transmitted from source to sink through an SDH network and therefore represent a "logical" path through the network. The sequence of identical VCs having the some relative position in subsequent frames forms a traffic stream along that path. Each VC contains a path overhead (POH) and a payload section referred to as container a (C). The US equivalent of SDH is known as SONET (Synchronous Optical Network). Another well known transport network with similar multiplexing units is the recently defined Optical Transport Network OTN; see ITU-T G.709, 02/2001.

A very basic aspect in all types of transport networks is availability and reliability of service. In other words, a transport network must be very robust against any kind of failure and the average outage time must be very low. Hence, a transport network needs to provide the means and facilities to ensure sufficient availability. Typically, network mechanisms,which ensure this availability are distinguished in protection and restoration. The common principle of both is to redirect traffic of a failed physical link or logical path over a spare resource.

Protection is a mechanisms where an already established protection path or link is assigned to one selected high-priority path or link (known as 1+1 or 1:1 protection, depending on whether there is low priority extra traffic on the protection resource or not) or a group of n such selected paths or links (known as 1:n protection). In the case of a failure, traffic can be re-routed very fast over the previously established protection resource under the sole control of the affected network elements in typically less than 50 ms. However; this requires a protocol between the affected nodes to signal and synchronize switch-over. Protection is a high-quality service restricted to few selected premium connections, which are typically charged at a higher price. Moreover, protection requires a high amount of spare resources compared with the amount of protected resources, i.e., 100% of spare capacity in the case of 1+1 protection.

Restoration refers to a mechanism, where the network searches for restoration capacity and establishes a restoration path only after a service path failure. Rather than calculating the restoration path after failure, pre-calculated restoration routes can be used instead but the cross-connections which establish the path are performed after failure. Restoration mechanisms are more stringent in the usage of spare capacity and however, providing a masking of the failure at a lower speed, typically in the range of a few seconds as completely new paths through the network must be established.

In label switched packet networks, as opposed to transport networks, alternative label switched paths (LSPs) can already be implemented and then used in the case of a failure. The fundamental difference between transport networks and packet networks, where MPLS applies (Multi-Protocol Label Switching), is that in packet networks statistical multiplexing is used allowing over-subscription of links and that an LSP can be established without using any bandwidth. However, in transport networks, if a path is established, then by definition the full bandwidth requested by the path is consumed, independent of whether traffic is transmitted over this path or not. An LSP can be established before failure in MPLS, but not used until after failure, whereas this is not possible in transport networks.

The IETF proposal "RSVP-TE Extension for Shared-Mesh Restoration in Transport Networks" by G. Li et al, draft-li-shared-mesh-restoration-01.txt, addresses this issue and proposes an GMPLS extension where backup paths are pre-established in the management plane of the network but only activated after detection of a failure. This requires signaling messages to be exchanged in the management plane, which in a GMPLS controlled network is distributed across the entire network. This interaction of a decentralized network management is, however, a relatively slow process, which leads to restoration times in the range of at least some hundred milliseconds.

The IETF proposal "Signaling for Fast Restoration in Optical Mesh Networks" by Bala Rajagopalan et al describes an alternative restoration method for GMPLS-controlled networks that proposes a new dedicated protocol rather than an RSVP-TE extension to communicate and synchronize setup of restoration paths.

EP1294136 describes a restoration method where a closed mesh is used to protect against failures of intersecting links. In the case of a failure, affected traffic is redirected automatically along the closed mesh. Based on the received signal, an automatic reconfiguration of the I/O ports is performed in each node to match the received signal structure.

EP 1463370 A1 which is incorporated by reference herein, describes a label-based restoration method in an SDH transport network, where each path in the network is identified at least locally with an identifier called a path tag which is part of the multiplex units that represent the corresponding path and forwarding information is provided in each network element. In the case of a path failure, the source network element cross-connects the affected traffic stream to an alternate output port. When a network element receives a new traffic stream at an input port, it checks the received path tag and determines an appropriate output port based on the tag and the forwarding information and establishes an internal cross-connection between the input port and corresponding output port. The forwarding information is provided by the management plane of the transport network and represents pre-calculated restoration paths.

Another method for signaling restoration information in a mesh network is known from EP 1134922 A2, which uses pre-computed restoration paths. Each node in the network has monitoring, signaling and crossconnect functionality and databases to participate actively in real time restoration. When a node detects a path failure, it formulates a signaling message for restoring the failed path. The restoration signaling message is thereafter relayed from one node to another in the overhead or payload of signaling paths that occupy the same bandwidth that is subsequently used by the restoration path. Once a signaling message is transmitted to an adjacent node, the node that transmitted the message makes a crossconnect that replaces the signaling path with a segment of the restoration path whose set-up was requested in the transmitted signaling message.

Both of these latter restoration methods, however, do not support extra traffic on the idle restoration resources but require that a "supervisory unequipped signal" or other kind of signaling path signal is sent along idle links. This results in an inefficient usage of resources.

SUMMARY OF THE INVENTION

It is thus an object of the present invention, to provide an improved restoration technique which provides on the one hand fast restoration in a transport network but which allows on the other hand during failure-free operation the transport of extra traffic over spare resources, provided for restoration purposes in the network.

These and other objects that appear below are achieved by a method of restoring in a transport network a bidirectional working path having a first signal structure according to a predefined multiplex hierarchy. The network contains a number of physically interconnected network elements. The method comprises performing a hop-by-hop path set-up of a restoration path over spare resources provided within said network by sending and forwarding between adjacent network elements a restoration request inserted into signals to be transmitted along said restoration path to be established and by establishing within said adjacent network elements local crossconnections conforming to said request according to routing information locally stored within said network elements. During failure-free operation, a low priority path having a second signal structure different from said first signal structure is allowed to be established using said spare resources. According to an aspect of the present invention, the method comprises the steps of:

pre-empting in the event of a failure an established low priority path to free said resources;

transmitting a restoration request between two adjacent network elements along said restoration path to be established a restoration request using said second signal structure;

upon reception of said restoration request at said second of said adjacent two network elements, reconfiguring said second network element to receive and transmit in direction from and towards said first network element transmission signals having said first signal structure;

sending an acknowledgment to said first network element using said first signal structure; and reconfiguring upon reception of said acknowledgment and alternatively upon occurrence of an alarm that indicates a mismatching signal structure said first of said two adjacent network elements to transmit along said protection path a transmission signal having said first signal structure.

In another aspect of the invention, a network element for a transport network is provided, which contains a number of I/O ports and a switch matrix for switching crossconnections between said I/O ports to establish paths through said transport network. At least some of the I/O ports are configurable to accept multiplex signals having one configurable signal structure according to a multiplex hierarchy and raise an alarm otherwise. The network element further comprises control means adapted to control said I/O ports to monitor received transmission signals for restoration requests;

to determine upon reception of a restoration request requesting a restoration path for a failed working path (WP) having a first signal structure according to a predefined multiplex hierarchy an appropriate output port conforming to said request from locally stored routing information;

to control said appropriate output port to transmit a restoration request over said spare resources using said second signal structure;

to control said appropriate output port to pre-empt an established low priority path having a second signal structure different from said first signal structure to free spare resources provided within the network for restoration purposes;

to reconfigure said appropriate output port to transmit and receive a transmission signal having said first signal structure, if either an acknowledgment is received or a mismatching signal structure is detected, and to control said matrix to switch a local crossconnection to said appropriate output port to set-up a segment of said restoration path.

In yet another aspect to the invention a controller is provided, which serves for a network element comprising a number of I/O ports and a switch matrix for switching crossconnections between said I/O ports to establish paths through a transport network. The controller is adapted to control said I/O ports to monitor received transmission signals for restoration requests;

to determine upon reception of a restoration request requesting a restoration path for a failed working path having a first signal structure according to a predefined multiplex hierarchy an appropriate output port conforming to said request from locally stored routing information;

to control said appropriate output port to transmit a restoration request over said spare resources using said second signal structure;

to control said appropriate output port to pre-empt an established low priority path having a second signal structure different from said first signal structure to free spare resources provided within the network for restoration purposes;

to reconfigure said appropriate output port to transmit and to receive a transmission signal having said first signal structure, if either an acknowledgment is received or a mismatching signal structure is detected, and to control said matrix to switch a local crossconnection to said appropriate output port to set-up a segment of said restoration path.

To restore a failed working path in a transport network, a restoration request is relayed in band between adjacent network elements and the path set up hop by hop over spare resources by establishing local crossconnections conforming to the request according to routing information locally stored within the network elements. During failure free operation, a low priority path for extra traffic with a different concatenation level (=signal structure) is allowed on the spare resources and preempted in the case of a failure. The restoration request is forwarded using the old signal structure of the extra traffic path. Only after reception of an acknowledgment sent back by the peering node using the new signal structure or when detecting that the signal structure has changed, the I/O port is also reconfigured to the new signal structure.

The invention supports extra traffic and different traffic priorities, supports multiple types of connectivity in a flexible manner, which is due to the dynamic interface structuring, reduces the required restoration time due to parallel activity in several nodes, and prevents misconnections with existing extra traffic signals.

BRIEF DESCRIPTION OF THE DRAWINGS

A preferred embodiment of the present invention will now be described with reference to the accompanying drawings in which.

DETAILED DESCRIPTION OF THE INVENTION

In this specification, we use the term transmission signal for a multiplex signal subdivided into frames of the same length. The frames are structured according to a multiplex hierarchy into multiplex units such as virtual containers VC in SDH. A particular multiplex unit represents a path through the network and repeats every frame. The sequence of identical multiplex units that are transmitted along the same path forms a traffic stream which transports a tributary signal. Several traffic streams are hence multiplexed according to the multiplex hierarchy to form the transmission signal.

Figure 1:
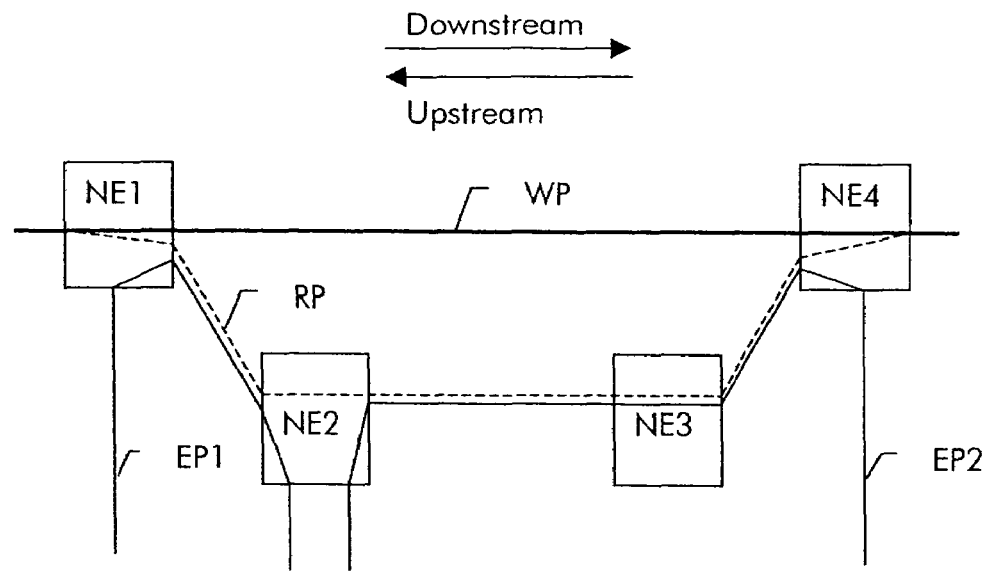
FIG. 1 shows an example network topology.

An example network topology is shown in FIG. 1. Four network elements NE1-NE4, i.e., add/drop multiplexers or crossconnects, are shown by way of example. A working path WP is established in the network via network elements NE1 and NE4. In the case of a failure, a restoration path RP from NE1 to NE4 can be established over network elements NE2 and NE3. Restoration resources are thus provided at the links between the nodes NE1, NE2, NE3 and NE4, respectively. It has to be noted that unlike a path protection mechanism, the protection path is not pre-established but is cross-connected only in the event of a failure.

In prior art restoration mechanisms, the management plane of the transport network is required to localize a failure by correlating received alarm reports and to request the affected network elements to switch new crossconnections to establish a dynamically calculated or pre-calculated restoration path.

Known restoration mechanisms are therefore relatively slow. Conversely, the invention uses a tag-based restoration mechanism similar to the one described in EP 1463370 A1. The idea behind is that in the event of a failure, a network element inserts a path tag into a signal on an idle resource. This path tag is used and interpreted as a restoration request by the receiving network element. All network elements monitor idle resources for signals with new, unknown path tags and switch such a signal upon reception of a new path tag to an appropriate output port, dynamically determined using information contained in a local routing table. With this "in-band" signaling, a hop-by-hop restoration is achieved, which does not require any time-consuming protocol to negotiate and synchronize a path set-up. Fault localization can be realized using the standardized tandem connection monitoring (TCM) function in combination with non-intrusive Tandem Connection monitoring and temporary Tandem Connection sources along a transmission path to forward fault location in both upstream and downstream direction. Such a fault localization mechanism is described in more detail in EP 1422968, which is incorporated by reference herein.

Normally, a supervisory or a simple unequipped signal (SU) is exchanged on the link between idle spare resources. A SU signal is a plain AU4 signal inside STM-N. The SU signal allows to transport the restoration requests and to monitor the spare resources for availability.

The need for idle spare resources leads, however, to an inefficient usage of network resources. It is thus a basic concept of the invention to enable the transport of extra traffic over such "spare" resources in order to increase network efficiency. Typically, traffic streams have priorities assigned. When according to the invention a higher priority traffic stream is to be restored, the extra traffic which has the lowest priority is superseded. A higher priority traffic stream may also supersede a lower priority traffic stream, which had previously been restored with spare resources.

This approach can be described in a more generic way when assigning priorities also to the SU signals and to extra traffic. SU signals shall have the lowest possible priority, extra traffic the next higher level of priority and all regular signals shall have higher level priorities assigned according to the operator needs. The general rule is then that a lower priority traffic stream—or path (LPP) is superseded as soon as a higher priority traffic stream—or path (HPP) requests the same resource.

Multiplex signals in a real network environment, however, have to support different signal characteristics, i.e. signal structures. In particular, multiplex signals can have different concatenation levels. The signal structure has to be pre-configured and known at the receive side interface. The consequence of these different structures is that an LPP may be superseded with a HPP of different signal structure.

Since there is no SU signal on the spare resources that allows the transport of a restoration request when there is LPP, it is necessary to implement a method that allows the transport of a restoration request of a HPP despite the presence of an existing LPP with different signal structure. On the one hand, a mismatching signal structure could cause a transmission failure in the receiving network element. Such a failure would as a consequence prevent access to the restoration request information. On the other hand, any negotiation between two nodes about the structure of the future path would increase the restoration time. Once a restoration request is received by the downstream node, the structure of the multiplex signal transmitted along the link between the two adjacent nodes could be changed.

Moreover, the nodes should make sure that a restoration request is not spread along the existing LPP that is to be superseded. A restoration request that is signaled over the existing LPP would normally be delivered to downstream nodes immediately, where such a request would be misinterpreted. It is therefore preferred that a restoration request is directed only to the subsequent downstream network node, where it has to be terminated.

Finally, it is important to ensure that an existing LPP and a restored HPP are never interconnected. The propagation of a restoration request is according to the invention implemented in a hop-by-hop manner. If some preceding nodes along the restoration path have already settled the new connection, the subsequent nodes still may have their "old" connections active. This would lead to temporary misconnections, which have to be avoided.

The invention seeks to implement a certain sequence of restoration actions in each node that allows parallel processing of the request in the involved nodes without interfering with existing extra traffic paths. A basic idea of the invention is thus to use in the first moment an existing lower priority path (LPP) and its signal structure to transport the restoration request. When the request is forwarded the LPP is disconnected and replaced with an SU which continues to transport the request. The restoration as such is performed in a hop-by-hop manner. Higher priority connections are established thereafter in a synchronized way between two peering nodes using a handshake mechanism. In other words, an existing path with an "old" signal structure is first used for fast forwarding of the restoration request and then the old signal is interrupted and replaced with an SU. This avoids the need for a complex protocol, enables parallel request processing and thus contributes to a short overall restoration time.

A HPP request is inserted into the first column of the STM frame the HPP is going to start. In the above example, the frame type on the spare resources between NE1, NE2, NE, and NE4 is in this example STM16. The path between NE1 and NE4 has the structure VC4-16c, while the spare resources are structured into VC4-4c for the LPP. The HPP is nevertheless requested for the first VC4-4c independently whether the LPP is located at position 1, 2, 3, or 4 in the STM16 frame. Once accepted by the downstream peering node, the interface structure is reconfigured from 4×VC4-4c to VC4-16c.

Figure 2:
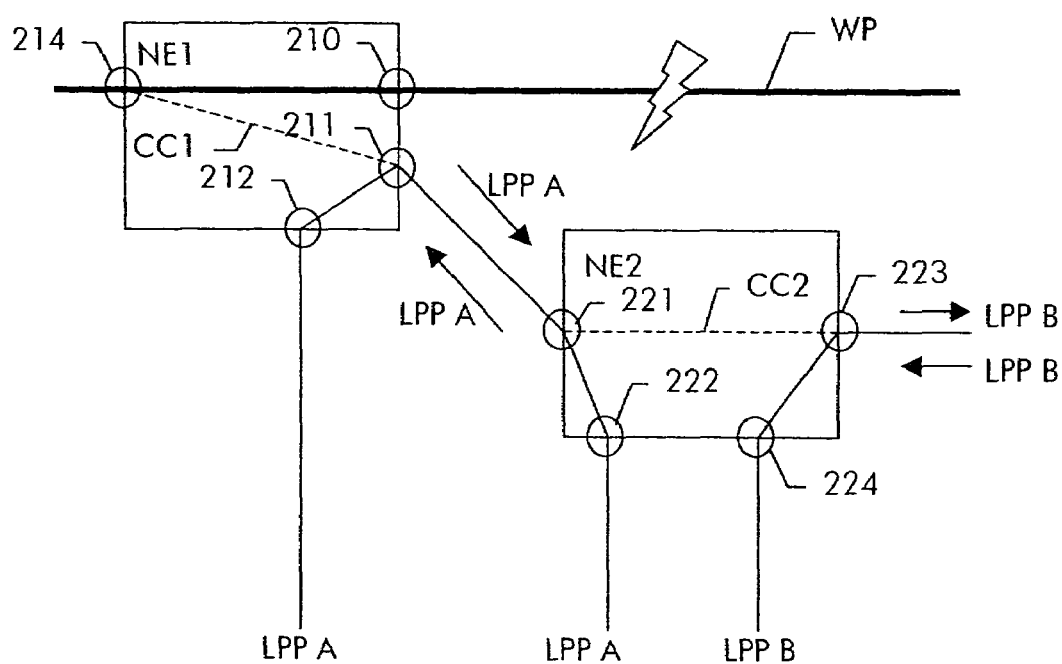
FIG. 2 shows a part of the network from FIG. 2 in more detail.

FIG. 2 shows network elements NE1 and NE2 in more detail. The direction of transmission from left to right is designated as downstream direction and direction from right to left as upstream. This designation is, however, arbitrary and has no technical meaning. All paths are bidirectional. It is shown that working path WP has failed. Thus, a restoration path has to be established. The affected ports of the network elements NE1, NE2 are shown as circles 210-213, 221-224, respectively. A first low priority path LPP A with extra traffic exists via port 212 internally crossconnected to port 211 of NE1 and via port 221 internally crossconnected to port 222 of NE2 and a second low priority path LPP B with extra traffic exists via port 224 crossconnected to port 223 of NE2. These existing LPPs have to be preempted to free the spare resources for a restoration path (HPP). It is assumed in this embodiment, that LPP and HPP have different signal structure, namely VC4-4c (LPP) and VC4-16c (HPP).

Figure 3:
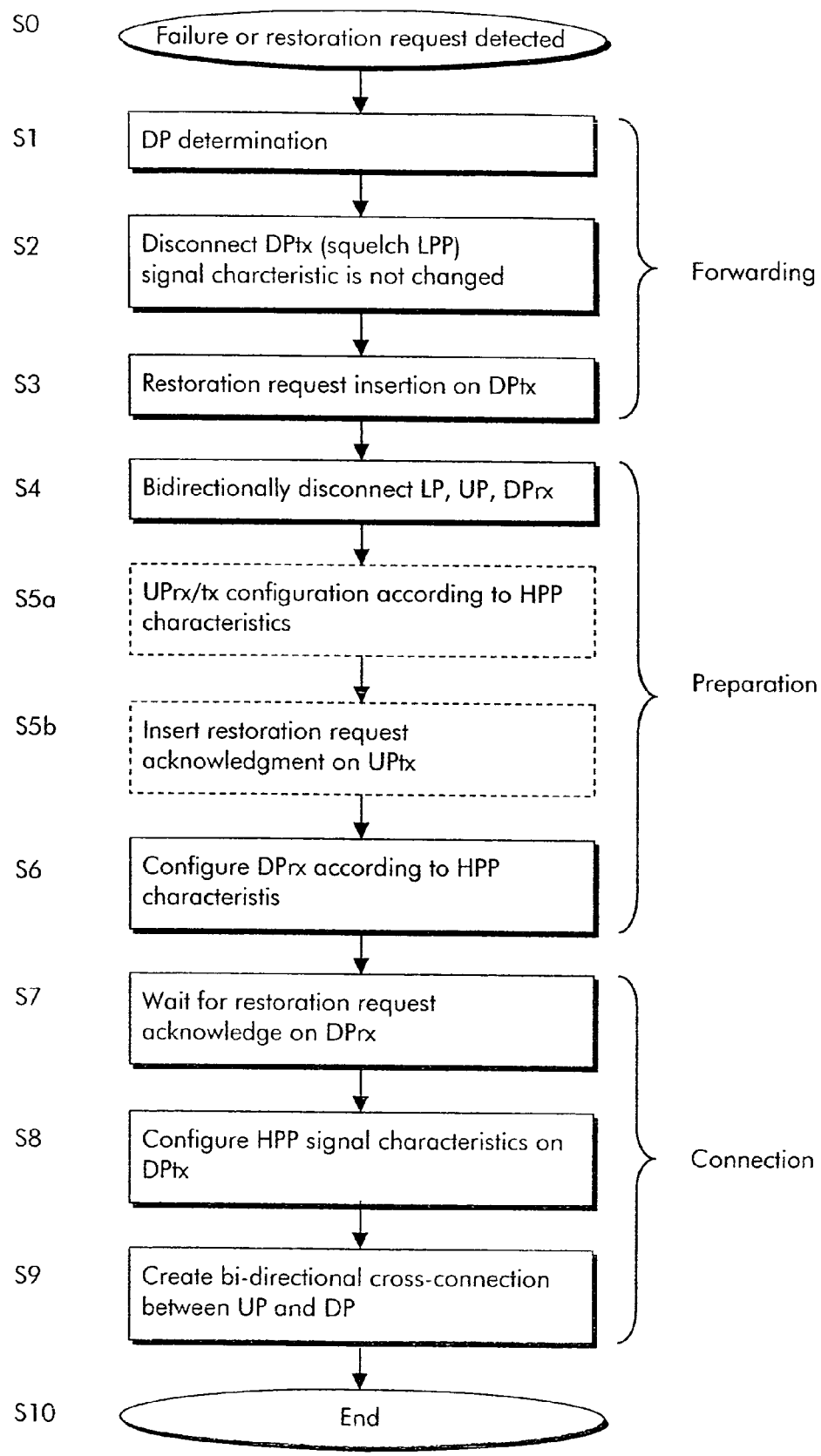
FIG. 3 shows a flow chart of the restoration actions according to the invention.

FIG. 3 shows in a flow chart the sequence of restoration actions that take place within a single network element (NE1) to establish the HPP. The restoration starts with detection of the failure at port 210 (see FIG. 2), which is denoted as step S0 in FIG. 3. A new downlink port has now to be determined (step S1). This step uses internal routing information to determine, over which output port the failed traffic could be restored. In the embodiment, this is output port 211, but where extra traffic LPP occupies the spare resource originally available for restoration.

In a step S2, the restoration request (i.e., the HPP restoration path tag) is inserted on the selected DPtx, using the path overhead and the signal structure of the LPP A. Steps S1-S2 are denoted as forwarding phase and for a fast restoration it is important that the requests are forwarded as fast as possible.

The next network element NE2 receives the restoration request at the upstream receiver (UPrx) of port 221 (step S0), determines the output port for the requested restoration path HPP (step S1) and inserts a restoration request at the downstream transmitter of port 223 (step S2), using the the path overhead and the signal structure of the LPP B.

Network element NE1 meanwhile disconnects the internal crossconnection of LPP A between ports 211 and 212 in both directions (step S3). Thus LPP A is replaced with an SU in downstream direction. The SU signal has the same signal structure as LPP A and continues to send the restoration request for the HPP. NE1 awaits now a request confirmation from NE2 at the downlink receiver (DPrx) of port 211 (step 5).

The request is confirmed when NE1 receives the HPP path tag as an acknowledge or if an alarm appears that indicates a mismatching signal structure. In the latter case NE2 has accepted the request and has changed the signal structure for its upstream port towards NE1 to the HPP signal structure while NE2 still expects the now mismatching signal structure of LPP B.

It is important that the signal structure on DPrx and DPtx is not changed before the next node returns a confirmation thus accepting the restoration request: In the same moment in which NE1 sends a request to NE2, NE2 could send a restoration request for a different path with different signal structure to NE1. If now the signal structures on DPrx of NE1 would have been immediately changed the request would not be detected at NE1 and the proceeding is blocked. Steps S4 to S5 are also denoted as preparation phase.

In the same way, NE2 internally disconnects LPP A/B and squelches LPP A/B (step 3) Then NE2 reconfigures receiver (UPrx) and transmitter (UPtx) of port 221 in uplink direction according to the HPP structure (step S4a) and inserts an acknowledgment (the path tag for HPP) for the restoration request into uplink direction at transmitter UPtx of port 221 (step 4b). Note that steps S5a and S5b are not performed at head end nodes which initiate the restoration, i.e., at NE1 in this embodiment. These steps are therefore shown as broken line boxes in the flow chart of FIG. 3.

While network element NE2 has reconfigured its port 221 to the new structure (step S4a) it still receives the path tag for LPP B at port 223, because it is assumed that the subsequent network element NE3 has not yet finished its preparation. NE2 waits now for a confirmation that NE3 has accepted the restoratoration request (step S5).

It depends on the concatenation level, whether an acknowledgment is received or whether an alarm occurs: If the receiver has a lower or equal concatenation level as the transmitter, it receives an acknowledgment an no alarm is raised. Otherwise, if the concatenation level of the receiver is higher than concatenation level of the transmitter, the receiver detects a "loss of pointer" condition (LOP), which prevents proper reception of the acknowledgment. The reason is that the first VC in a concatenation has a valid pointer value but the remaining VCs in the concatenation carry only a concatenation indicator rather than a valid pointer value. This means that if for example the receiver expects a VC4-4c but receives a VC4-16c, only, no alarm is raised because there is a valid pointer value, while in the opposite situation, if the receiver expects a VC4-16c but receives a VC4-4c, an alarm is raised.

NE1 in turn receives the confirmation for the restoration request (HPP path tag or a signal structure mismatch alarm) from NE2 and in response reconfigures port 211 to the structure of the HPP signal (step S6). Then it switches a local bidirectional crossconnection CC1 between ingress port 213, i.e. the upstream port (UP) for this path, and downstream port (DP) 211 to establish the new path HPP. Steps S6 to S7 are denoted as the connection phase. Equally, NE2 receives some time later the confirmation from NE3, reconfigures the transmit interface of port 223 and switches a local crossconnection CC2 between ports 221 and 223.

In other words, the forwarding phase contains the following actions: In a very first step the downlink port (DP) is determined from local routing information. In order to achieve parallel processing in the nodes, the restoration request is propagated as early as possible to the next downstream node. This is achieved by using the actual configuration of the downstream port transmit interface (DPtx) to avoid any mismatch with the downstream node configuration or time consuming negotiations between both nodes.

If the LPP signal is in AIS the forwarding is delayed until the SU is activated in the preparation phase. Such exceptional AIS condition could have various reasons:

LPP coming from the client network may already be in AIS
some LPP segments may already be superseded with other restoration requests, or
the previous upstream node has already disconnected the LPP.

Those skilled in the art will, however, appreciate that instead of the standardized SU signal, any other appropriate idle signal would equally be suitable for this purpose. According to the invention, it is only important that this idle signal can be used to transport the request and that the request can be read at the next node.

In the event that several restoration requests arrive within the same time window, these would preferably all be forwarded first. Thus the preparation and/or connecting phase may be delayed or even interrupted if new requests have to be forwarded.

During the preparation phase, the downstream transmitter and receiver are disconnected and the LPP signal is replaced with a SU. This SU ensures that the request is still transported to the next downstream node.

At next the upstream transmitter and receiver (UPrx/tx) are disconnected and LPP is substituted with an SU signal. Next, UPrx/tx are configured according to the HPP structure. As soon as all LPPs (UP,DP) are disconnected and the node has adapted the upstream interface structure, it inserts the restoration request acknowledgement in the UPtx SU signal. The acknowledge sent back to the upstream node or a signal structure mismatch alarm indicates that all LPPs are disconnected and that the upstream node can create the new cross connections without any risk for misconnections.

In the connection phase, a network node creates the new cross connections and removes the SU generator as soon as it receives the confirmation for the restoration request from the peering downstream node. All ports are thus configured according to the HPP characteristics.

Figure 4:
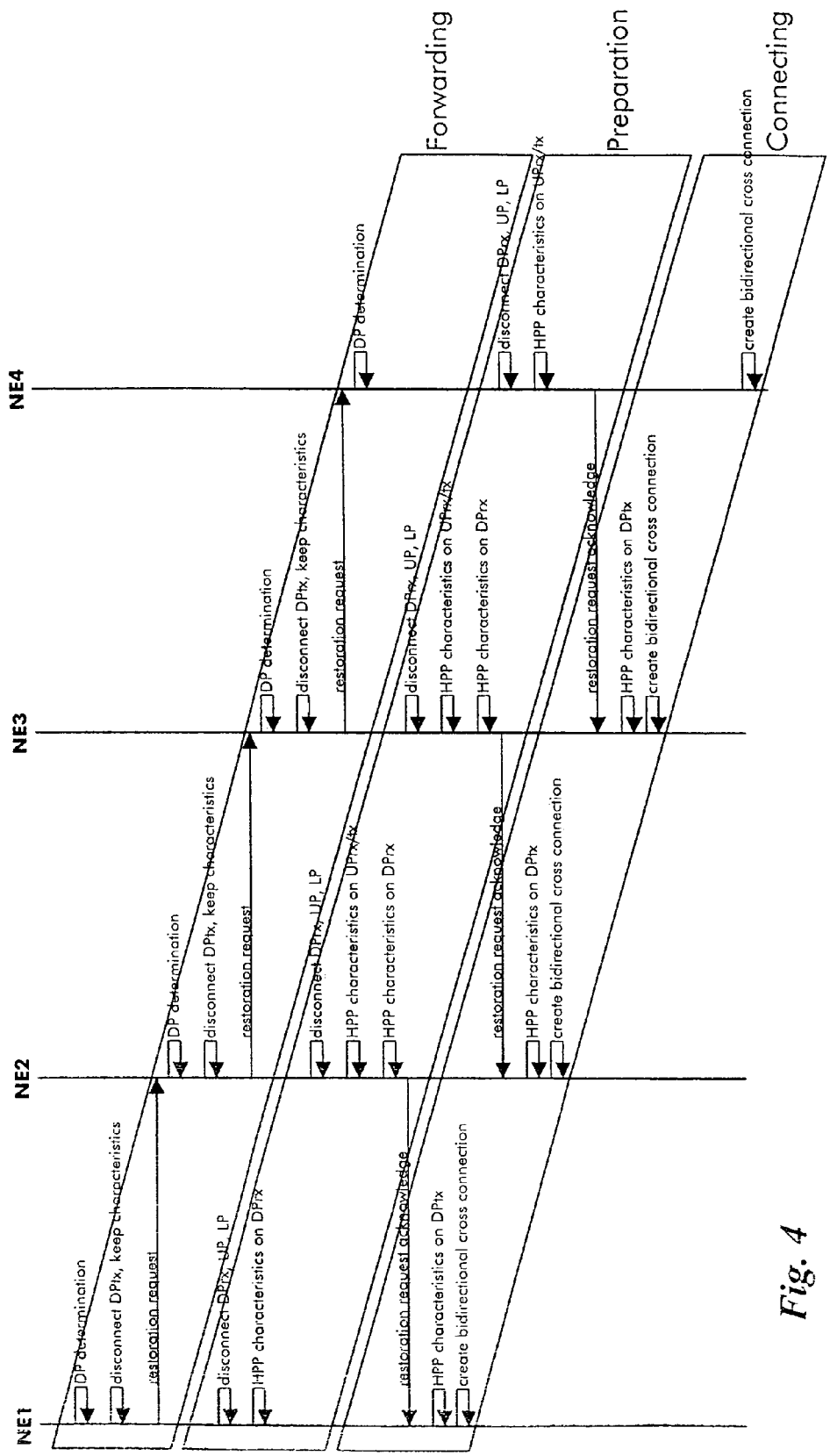
FIG. 4 shows the chronological progress of the restoration in the network.

FIG. 4 shows a scenario with all nodes NE1 to NE4 and how these perform parallel processing due to the fast request forwarding. The figure shows the forwarding phase, the preparation phase and the connection phase for all four network elements. As can be clearly seen, the request passes hop by hop from NE1 over NE2 and NE3 to NE4. As soon as the request receives a new network element, the request processing starts in this network element and it runs in parallel to the one in the requesting network element. All network elements thus prepare and connect the restoration path more or less in parallel. This results in a very flexible, robust and fast restoration mechanism. When the last network element, i.e., NE4, has switched the internal crossconnection, the restoration path is finally established and traffic from HPP restored.

Figure 5:
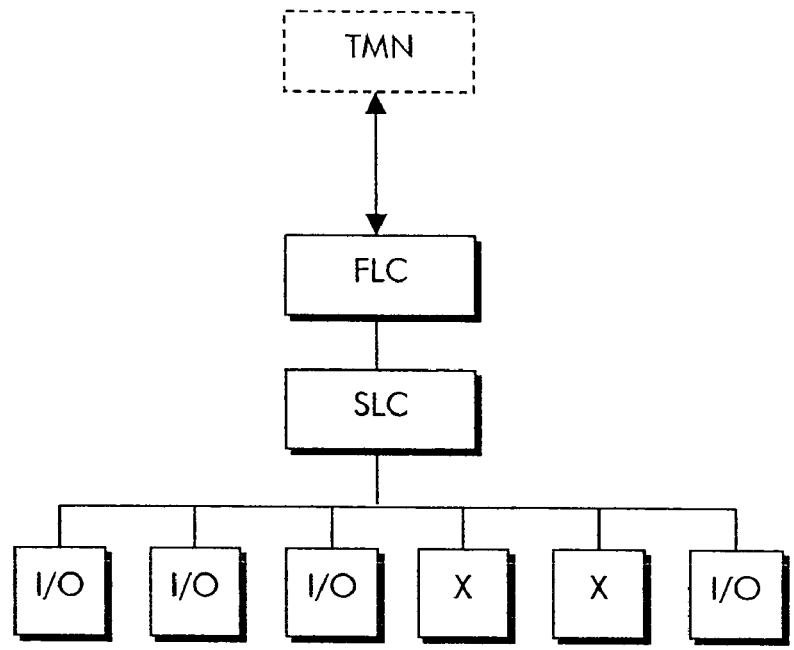
FIG. 5 shows the control and management of a network element.

In the following, an embodiment of a network element according to the invention will be explained in some more detail. The hardware design and control of a network element is shown schematically in FIG. 5. The network element itself consists of a number of hardware modules, such as input/output boards I/O and crossconnect matrix boards X shown in the embodiment by way of example. Each I/O board accommodates a number of I/O ports, for instance 4 STM16 ports. Each port has an input interface (receiver) and an output interface (transmitter). The matrix boards serve to interconnect any path (e.g., any time slot in the input signal representing a tributary signal) from any input port to any output port. Interconnections and signal flow of transmission signals are, however, not shown in the figure.

The individual boards are controlled and configured by a low level hardware controller, which is termed the second level controller SLC. The second level controller can be distributed among the boards, can consist of some few shelf controllers, or can also be a single controller if the network element is installed in only one shelf. It contains the hardware oriented control software which is termed firmware. The second level controller is controlled by a higher level controller called the first level controller FLC. This first level controller contains for the purpose of network management an abstraction of the network element and its resources in the form of a management information base (MIB). The MIB contains managed objects respectively representing the physical and logical resources of the entire network element and their configuration. A virtual hardware module and a firmware adaptor interface the MIB in the first level controller towards the firmware in the second level controller.

The first level controller FLC is controlled by a network management or management plane TMN, which may be a central network management system for the entire network. The interface between the central network management system and the network elements is known as the Q-interface for which a standardized protocol exists. Alternatively, the management plane may be a distributed network management system where each network element is controlled by an individual element controller and where these element controllers communicate with each other using the recently defined GMPLS protocol to find a route through the network and establish network paths. Communication within the management plane and towards the network elements uses a dedicated packet switched control network apart from the transport network. However, some interconnections in this dedicated control network may use overhead bytes known as the data communication channels in the section overhead of transmission signals in the transport network.

The management plane TMN is responsible to properly configure the entire network. If for example a new connection is to be established in the network, the management plane instructs the first level controllers of the affected network elements to switch the new connection. The first level controllers reconfigure their abstract view of the corresponding network elements accordingly and update their persistent configuration data. Then the request is forwarded to the second level controller, which determines the actual hardware modules involved and reconfigures these to establish the connection as requested.

In reverse direction, the second level controller monitors the hardware modules for any alarm and failure conditions and reports these to the first level controller. The first level controller maps alarm and failure reports on the abstraction and reports any irregularities to the management plane.

In known restoration mechanisms, the management plane needs to localize a failure by correlating received alarm reports and requests the affected network elements to switch new crossconnections to establish a dynamically calculated or pre-calculated restoration path. However, from the above explained, it would be evident, that this process requires extended time consuming communication and processing, which sums up to a considerably high restoration time.

Conversely, as per the present invention, information about pre-calculated restoration paths is provided at the lowest level, i.e., in the second level controller SLC or even within the hardware as such. Switching of the local crossconnections necessary to establish a restoration path in the event of a failure is thus triggered with locally available information, only.

In the event of a failure, traffic on path level is marked with an identifier, which has unambiguous meaning at least locally. The interfaces of a network element are permanently monitored for new traffic streams. If a new traffic stream is detected at an interface, this traffic stream will then automatically be crossconnected to the appropriate output port as defined by the locally available forwarding information provided in the form of a forwarding table.

Figure 6:
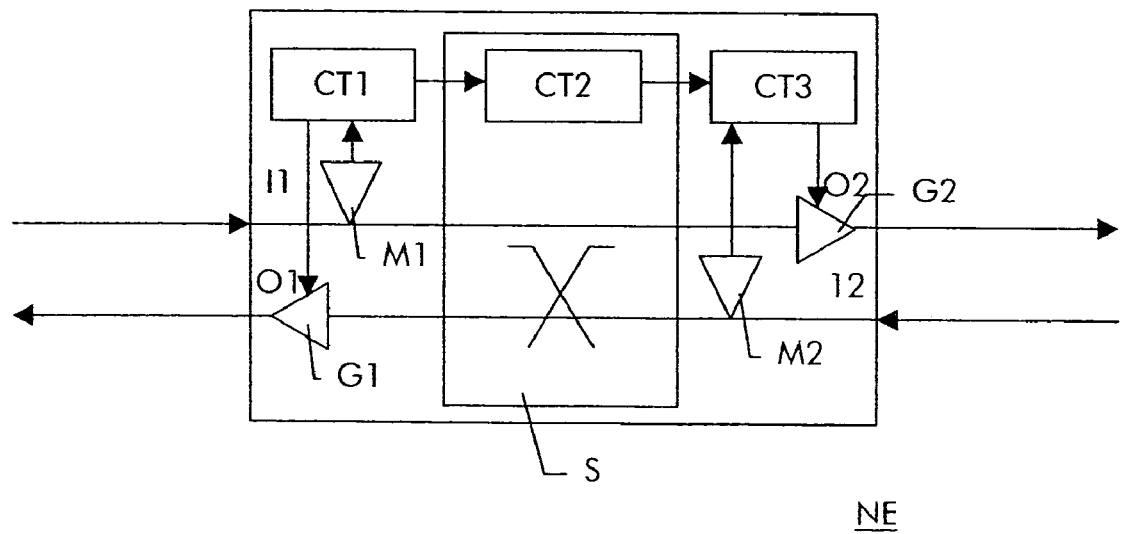
FIG. 6 shows the design of a network element used with the invention.

FIG. 6 shows a network element NE with a first I/O port comprising a first receiver I1 and first transmitter O1 and with a second I/O port comprising a second receiver I2 and a second transmitter O2. It has to be noted that these two I/O ports are shown only be way of example but that the network element has in reality more than only two I/O ports. A crossconnect matrix S in the network element is provided between the I/O ports to allow crossconnections from any input to any output under the control of a matrix controller CT2. Such crossconnections are semi-permanent through-connections for individual multiplexing units that repeat periodically in the received multiplex signal. Crossconnections thus appear as transparent connections on path level.

The first I/O port is controlled by I/O controller CT1 and the second I/O port is controlled by I/O controller CT3. Controllers CT1-CT3 form the second level controller of the network element. A first level controller is not shown in this figure since according to the invention, restoration paths are through-connected without interaction of the first level controller and the superordinate management plane.

A monitor M1 is provided at receiver I1, which monitors received traffic streams. In particular, the monitor checks the path tags of traffic streams in the received transmission signal. If a received path tag corresponds to the configured path tag, then everything is all right. If the monitor M1 detects a mismatch between a received tag and configured tag, then it raises a corresponding alarm towards the I/O controller CT1 and reports the received tag. This is particularly the case when a new traffic stream is received at the receiver I1, for example due to a restoration action of the preceding network element. The I/O controller CT1 checks then a forwarding table stored in a memory of the controller to determine to which I/O port the newly received traffic stream shall be crossconnected and instructs the associated I/O controller M3 accordingly, so that the necessary steps as explained above can be performed there A pattern generator G1 is provided at transmitter O1, which serves to generate an idle signal referred to as supervisory unequipped signal (SU) in currently unused time slots that represent the spare transmission capacity. A similar pattern generator G2 is also foreseen at transmitter O2.

According to the present invention, the distributed second level controller CT1-CT3 are adapted to perform the sequence of restoration actions as thoroughly explained above. In particular, the I/O controller assigned to a downstream port controls squelching of an extra traffic signal (LPP), insertion of the restoration request and reconfiguration of the interfaces to the new signal structure; the I/O controller assigned to an upstream port control disconnection of an extra traffic signal when a restoration request is received and reconfiguration to the new signal structure, and the matrix controller assigned to the matrix boards controls set-up of the internal crossconnection.

Although not preferred, it would be alternatively possible to control the I/O ports and matrix boards by an external controller. Anyway, all existing network elements require a correct configuration of the I/O ports according to the received signal structure and have to raise an alarm when a signal with unexpected signal structure is received. As the signals in upstream and downstream direction are usually of the same structure, existing network elements cannot be configured to handle different signal structures in the opposite directions of transmission at the same I/O port. Thus, the minimum change to a network element necessary to implement the method according to the invention would be to allow the I/O ports to be configured independently in both directions of transmission during sending of the restoration request and reception of an acknowledgement. Network elements may have different types of I/O port. An SDH network element may have for instance STM-N ports and tributary ports. It is apparent that in such a case, only the STM-N ports need to be configurable for different signal structures.

Although having described now a preferred embodiment of the invention in full detail, those skilled in the art would appreciate that various changes, alterations, and substitutions can be made without departing from the concepts of the present invention.

What is claimed is:

1. A method of restoring in a transport network a bi-directional working path having a first signal structure according to a predefined multiplex hierarchy, said network comprising a number of physically interconnected network elements, including a first network element carrying high priority traffic on a high priority working path; said method comprises performing a hop-by-hop path set-up of a restoration path over spare traffic paths provided within said network by sending and forwarding between adjacent network elements a restoration request inserted into signals to be transmitted along said restoration path to be established and by establishing within said adjacent network elements local crossconnections conforming to said request according to routing information locally stored within said network elements;

forming a low priority traffic path from among said spare traffic paths and transmitting on the low priority path, during failure-free operation, low priority traffic having a second signal structure different from said first signal structure, the low priority path including said first network element and a second network element adjacent to and receiving the low priority traffic from the first network element;

in the event of the first network element detecting a failure of the high priority working path, determining at the first network element that the second network element is to be the next network element on the restoration path to be established;

disconnecting at the first network element the transmission of the low priority traffic to the second network element;

transmitting said restoration request from the first to the second network element on the low priority traffic path using said second signal structure;

upon reception of said restoration request at the second network element and in the event of the second network element determining that a third network element, adjacent to and receiving low priority traffic from the second network element on the low priority traffic path, is to be the next network element on the restoration path to be established, disconnecting at the second network element the transmission of the low priority traffic to the third network element, and transmitting a second restoration request from the second to the third network element on the low priority traffic path using said second signal structure;

after reception of said restoration request at the second network element, reconfiguring said second network element to receive and transmit, in direction from and towards the first network element, transmission signals having said first signal structure;

sending an acknowledgement from said second network element to said first network element using said first signal structure;

said first network element reconfiguring upon reception of said acknowledgment, and alternatively upon occurrence of an alarm that indicates a mismatching signal structure, for transmission of the high priority traffic signal to the second network element, using said first signal structure;

whereby the spare traffic paths are configured to be utilizied to carry low priority traffic during failure-free operation, and use of the second signal structure enables quick transmission of a restoration request to an adjacent network element over the spare traffic paths, and whereby segments of a restoration path are established between adjacent network elements, hop-by-hop, in parallel with network elements furthur along the restoration path transmitting and responding to restoration requests.

2. A method according to claim 1 wherein the first network element inserts a path tag for the restoration path into the low priority path, using the second signal structure, and the second network element treats the tag as a restoration request;

and the second network element sends the same path tag to the first network element, using the first signal structure, and the first network element treats the tag as an acknowledgement.

3. A method according to claim 1 comprising the step of squelching said low priority path.

4. A method according to claim 1 comprising sending an idle signal over said low priority traffic path after disconnecting at the first network element the transmission of the low-priority traffic to the second network element.

5. A method according to claim 4, wherein said idle signal is a supervisory or simple unequipped signal.

6. A method according to claim 1, wherein different priority levels are assigned to different working paths in said network.

7. A method according to claim 6 wherein in the event that a higher priority working path is to be restored but said spare traffic paths are occupied by a working path having a lower priority level, said lower priority working path is pre-empted.

8. A method according to claim 1 wherein in the event that more than one working paths need to be restored, several restoration requests are forwarded and the restoration path of the highest priority is finally established.

9. A network element for a transport network comprising: a number of I/O ports and a switch matrix for switching crossconnections between said I/O ports to establish paths through said transport network; at least some of said I/O ports being configurable to accept multiplex signals having one configurable signal structure according to a multiplex hierarchy and raise an alarm otherwise; said network element further comprising control means configured to control said I/O ports to monitor received transmission signals for received restoration requests from adjacent network elements;

to determine, upon reception at a first I/O port from a first adjacent network element of such a restoration request requesting a restoration path for a failed working path (WP) having a first signal structure according to a predefined multiplex hierarchy, an appropriate second I/O port conforming to said request from locally stored routing information;

to control said second I/O port to pre-empt an established low priority path having a second signal structure different from said first signal structure to free spare resources provided within the network for restoration purposes;

to control said second I/O port to transmit to a second adjacent network element an outgoing restoration request over said spare resources using said second signal structure;

to send a restoration request acknowledgement at the first I/O port to the first adjacent network element;

to reconfigure said second I/O port to transmit and receive a transmission signal having said first signal structure, if either a restoration request acknowledgment is received at the second I/O port from the second adjacent network element or a mismatching signal structure is detected, and to control said matrix to switch a local crossconnection to said second I/O port to set-up a segment of said restoration path using the first signal structure, whereby the spare resources are configured to be utilized to carry low priority traffic during failure-free operation, and use of the second signal structure enables quick transmission of a restoration request to an adjacent network element from the spare resource I/O ports, and whereby segments of a restoration path are established between adjacent network elements, hop-by-hop, in parallel with network elements further along the restoration path transmitting and responding to restoration requests.

10. A controller for controlling a network element, said network element including a number of I/O ports and a switch matrix for switching crossconnections between said I/O ports to establish paths through a transport network; said controller being configured to control said I/O ports to monitor received transmission signals for received restoration requests from adjacent network elements;

to determine, upon reception at a first I/O port from a first adjacent network element of such a restoration request requesting a restoration path for a failed working path having a first signal structure according to a predefined multiplex hierarchy, an appropriate second I/O port conforming to said request from locally stored routing information;

to control said second I/O port to pre-empt an established low priority path having a second signal structure different from said first signal structure to free spare resources provided within the network for restoration purposes;

to control said second I/O port to transmit to a second adjacent network element an outgoing restoration request over said spare resources using said second signal structure;

to send a restoration request acknowledgement at the first I/O port to the first adjacent network element;

to reconfigure said second I/O port to transmit and to receive a transmission signal having said first signal structure, if either restoration request acknowledgment is received at the second I/O port from the second adjacent network element or a mismatching signal structure is detected, and to control said matrix to switch a local crossconnection to said second I/O port to set-up a segment of said restoration path using the first signal structure, whereby the spare resources are configured to be utilized to carry low priority traffic during failure-free operation, and use of the second signal structure enables quick transmission of a restoration request to an adjacent network element from the spare resource I/O ports, and whereby segments of a restoration path are established between adjacent network elements, hop-by-hop, in parallel with network elements further along the restoration path transmitting and responding to restoration requests.

* * * * *